(12) United States Patent
Hsu

(10) Patent No.: US 6,789,991 B2
(45) Date of Patent: Sep. 14, 2004

(54) SCREW

(76) Inventor: Kuo-Tai Hsu, No. 70, Alley 299, Lane 12, Sec. 2, Chang Ho St., Tainan (TW)

(*) Notice: Subject to any disclaimer, the term of this patent is extended or adjusted under 35 U.S.C. 154(b) by 0 days.

(21) Appl. No.: 10/127,671

(22) Filed: Apr. 23, 2002

(65) Prior Publication Data

US 2003/0198532 A1 Oct. 23, 2003

(51) Int. Cl.[7] ................................................ F16B 25/10
(52) U.S. Cl. ..................... 411/387.6; 411/311; 411/413; 411/421
(58) Field of Search ........................ 411/308–311, 386, 411/387.1–387.8, 411–413, 417, 418, 420, 421

(56) References Cited

U.S. PATENT DOCUMENTS

| | | | | |
|---|---|---|---|---|
| 2,200,227 A | * | 5/1940 | Olson ........................... 52/364 |
| 2,263,137 A | * | 11/1941 | Oestereicher ................ 411/413 |
| 4,697,969 A | * | 10/1987 | Sparkes ..................... 411/387.7 |
| 5,273,383 A | * | 12/1993 | Hughes ....................... 411/311 |
| 5,827,030 A | * | 10/1998 | Dicke ......................... 411/387.4 |
| 5,895,187 A | * | 4/1999 | Kuo-Tai ...................... 411/386 |
| 6,056,491 A | * | 5/2000 | Hsu ............................ 411/418 |
| 6,065,919 A | * | 5/2000 | Peck ........................... 411/412 |
| 6,336,779 B1 | * | 1/2002 | Jakob et al. ................. 411/175 |

FOREIGN PATENT DOCUMENTS

GB 2055652 A * 3/1981 ........... B23G/00/00

* cited by examiner

*Primary Examiner*—Flemming Saether
*Assistant Examiner*—Jori Schiffman
(74) *Attorney, Agent, or Firm*—Rosenberg, Klein & Lee

(57) ABSTRACT

A screw includes a rod-shaped portion, and a spiral-shaped thread winding around the rod-shaped portion. The rod-shaped portion has a straight portion, and a front end portion tapering towards a pointed front end. Several cutting trenches are formed on the rod-shaped portion for cutting bits off a workpiece with which when the screw is being screwed into the same. The tapering front end portion is provided with a notch, and cutting teeth are provided on that portion of the thread corresponding to the tapering front end portion. Cut-off bits of a workpiece can be received in the trenches as well as the cutting teeth so that the same can't have excessive resistance against the screw.

6 Claims, 6 Drawing Sheets

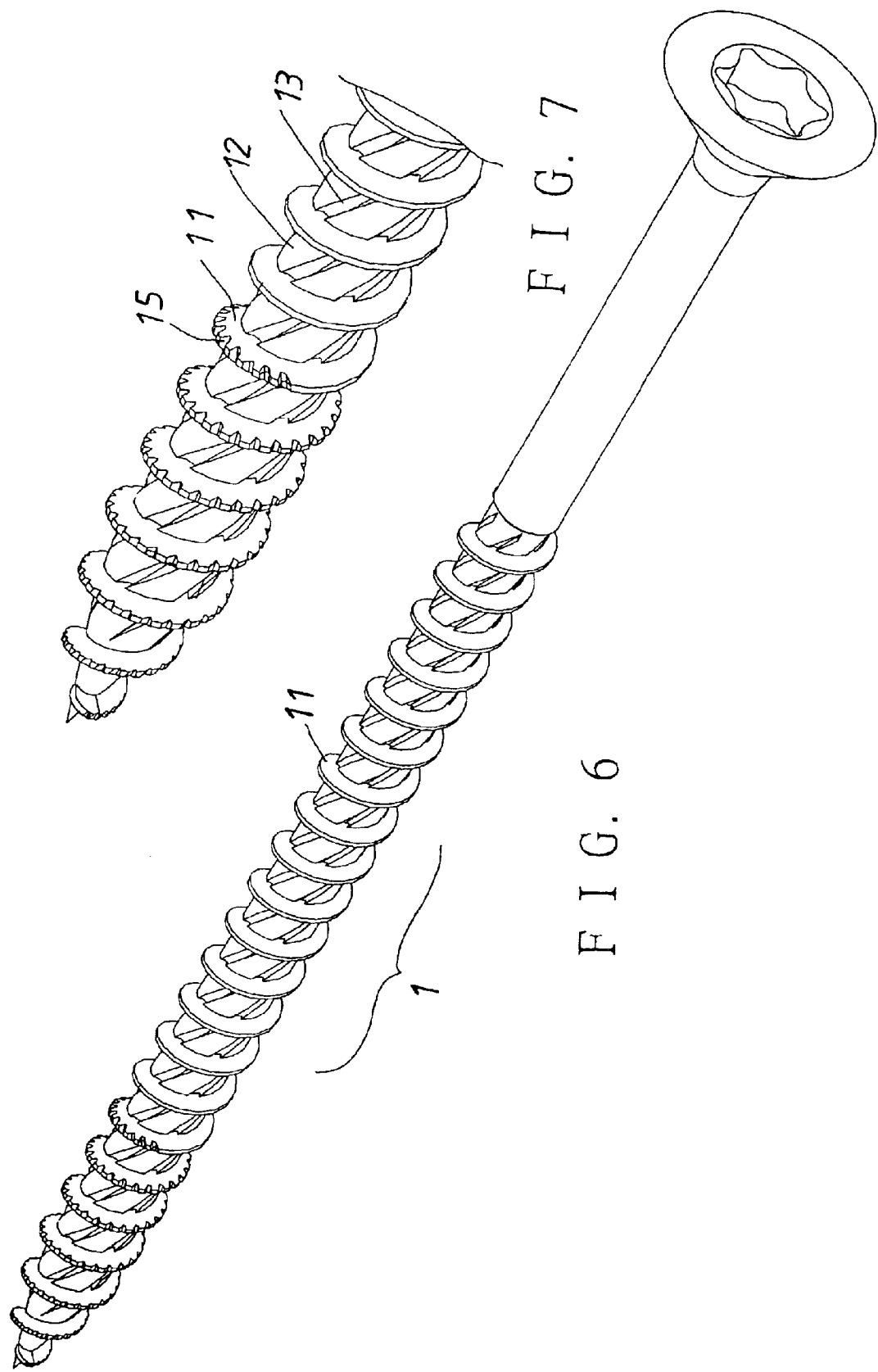

SCREW

BACKGROUND OF THE INVENTION

The present invention relates to a screw, more particularly a screw, which is formed with several cutting trenches on the rod-shaped portion thereof for allowing cut-off bits of a workpiece to be deposited in to reduce resistance of the bits of wood when screwed into the workpiece.

A conventional screw includes a front-end screw-in portion and a straight portion. The screw-in portion tapers off towards a pointed end. A continuous spiral-shaped thread is formed on both the screw-in portion and the straight portion so that the screw can be screwed into a workpiece. However, the screw is likely to cause cracks on the workpiece because the screw is forced into the same without cutting off bits of the workkpiece. And, the screw is subject to excessive resistance of the workpiece.

To overcome the disadvantages of the above conventional screw, referring to FIGS. 10, and 11, an improvement 2 on the screw was provided which is formed with cutting trenches 22 on the outward edge of the spiral thread 21 such that bits of a workpiece can be cut off from the spiral passage in the wokpiece that is formed by the thread when the screw is being screwed into the same. However, it is found that cut-off bits of workpiece will very quickly fill the cutting trenches 22 that have very limited capacity, becoming an undesirable resistance against the screw.

SUMMARY OF THE INVENTION

Therefore, it is a main object of the present invention to provide a screw, which is shaped in such a manner as to be able to be screwed into a workpiece easily and without causing cracks on the workpiece while the tightness of connection is not reduced.

The screw of the present invention includes a rod-shaped portion, and a spiral-shaped thread winding around the rod-shaped portion. Several cutting trenches are formed on the rod-shaped portion for cutting bits off a workpiece with which when the screw is being screwed into the same. A tapering front end portion of the rod-shaped portion is provided with a notch, and cutting teeth are provided on that portion of the thread corresponding to the tapering front end portion. Cut-off bits of a workpiece can be received in the trenches as well as the cutting teeth so as to have reduced resistance against the screw, thus allowing the screw to be screwed into the workpiece relatively easily without possibility of causing cracks on the workpiece.

BRIEF DESCRIPTION OF THE DRAWINGS

The present invention will be better understood by reference to the accompanying drawings, wherein:

FIG. 6 is a perspective view of the screw of a third embodiment of the present invention.

FIG. 7 is a partial perspective view of the screw of FIG. 6.

DETAILED DESCRIPTION OF THE PREFERRED EMBODIMENTS

Figures 1, 2:
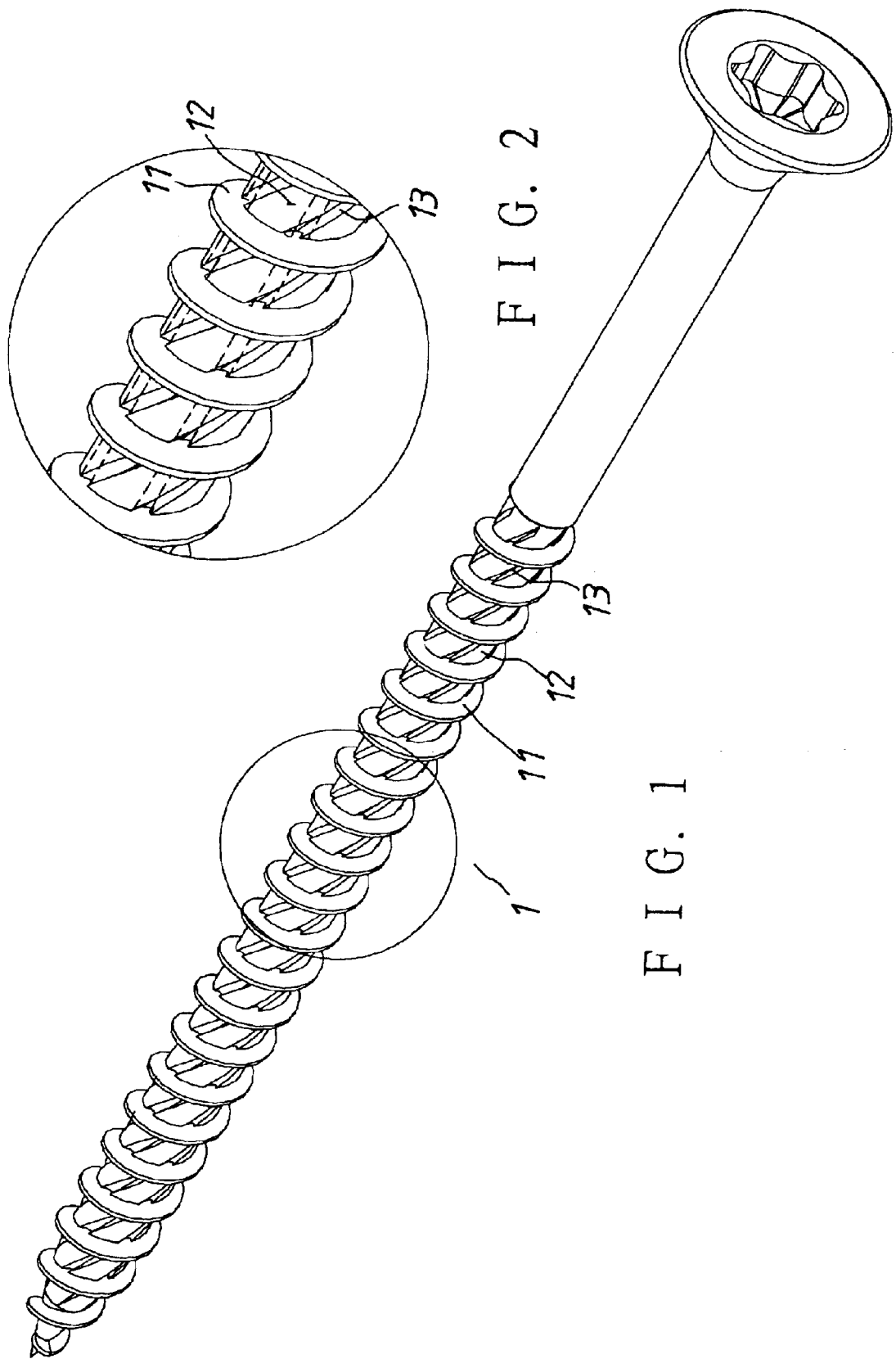
FIG. 1 is a perspective view of the screw of the present invention.
FIG. 2 is a partial perspective view of the screw of the present invention.
Figure 3:
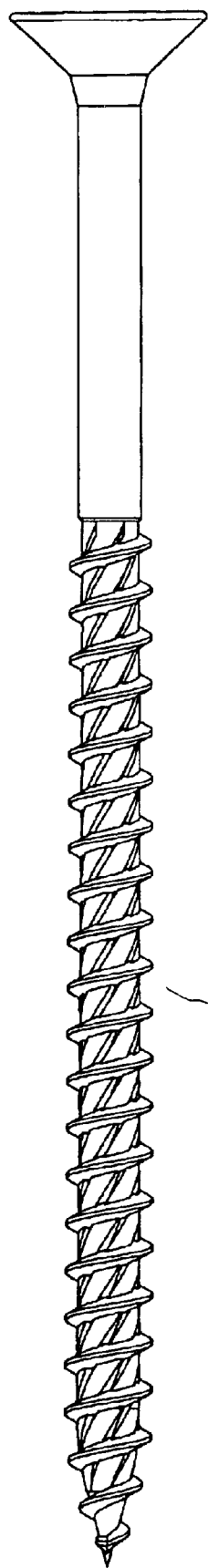
FIG. 3 is a side view of the screw of the present invention.
Figure 4:
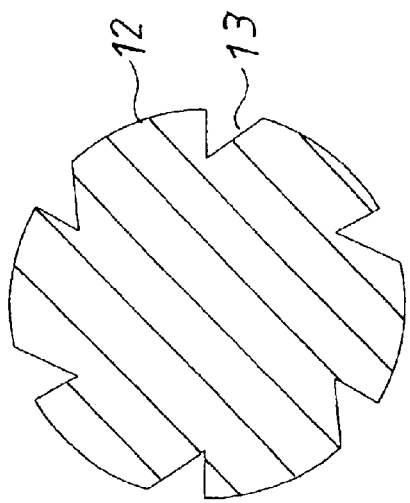
FIG. 4 is a cross-sectional view of the screw of the present invention.

Referring to FIGS. 1 and 2, a screw 1 of the present invention includes a rod-shaped portion 12, and a continuous spiral-shaped thread 11 winding around the rod-shaped portion 12. The rod-shaped portion 12 includes a straight portion, and a front end portion tapering towards a pointed front end tip. Several cutting trenches 13 are formed on the rod-shaped portion 12 such that when the screw is being screwed into a workpiece, it can cut off bits form the workpiece with edges of the cutting trenches 13. The cutting trenches 13 can be made to be straight (as shown, for example, by broken lines in FIG. 2) or alternatively have a spiral shape. Another purpose of the cutting trenches 13 is to receive the cut-off bits of a workpiece therein so that the cut-off bits of the workpiece won't form excessive resistance against the screw, and are guided from the workpiece. Therefore, referring to FIG. 4, the cutting trenches 13 are preferably provided such that the ratio of the dimension of the cutting trenches 13 to the diameter of the rod-shaped portion is more than a comparable ratio of an outer extent of the prior screw to the diameter of the rod-shaped portion of the prior screw.

Figure 5:
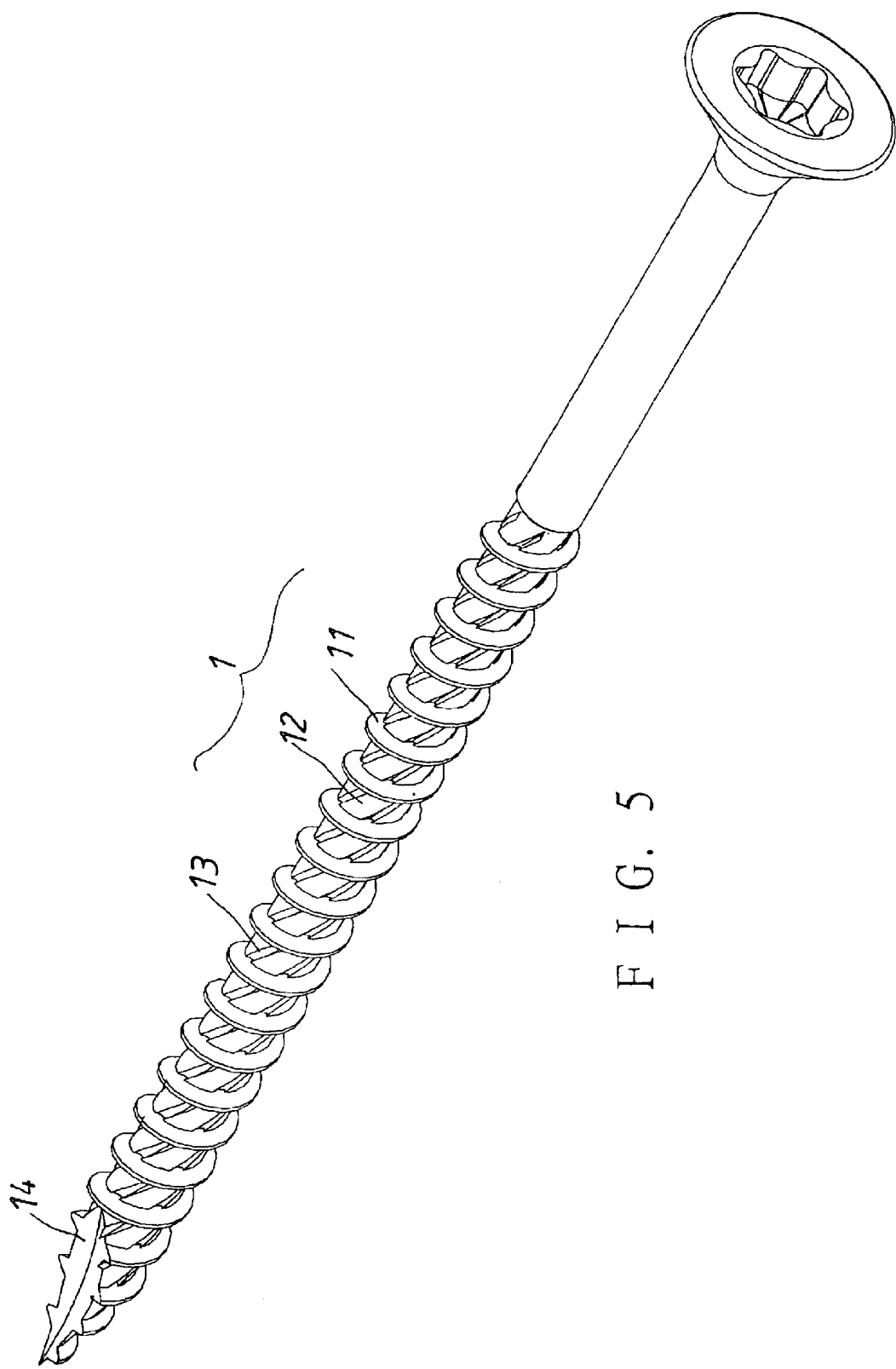
FIG. 5 is a perspective view of the screw of another embodiment of the present invention.

Referring To FIG. 5, the rod-shaped portion 12 is provided with a notch 14, which is formed along the tapering front end portion thereof as well as being cut onto those portions of the thread 11 that correspond to the tapering front end portion. The notch 14 can cut a hole on the workpiece to help the tapering front end portion to rapidly screw into the same and to prevent the workpiece from cracking; the part of the workpiece cut off by the notch 14 is then partially deposited into the cutting trenches 13.

Referring to FIGS. 6, and 7, the thread 11 is provided with cutting teeth 15 on those portions that correspond to the tapering front end portion of the rod-shaped portion such that bits of a workpiece can be cut off from the spiral passage that is formed in the wokpiece by the front portion of thread 12 when the screw is being screwed into the same. And, some of the bits of a workpiece can be deposited in the spaces between the cutting teeth 15.

Figure 9:
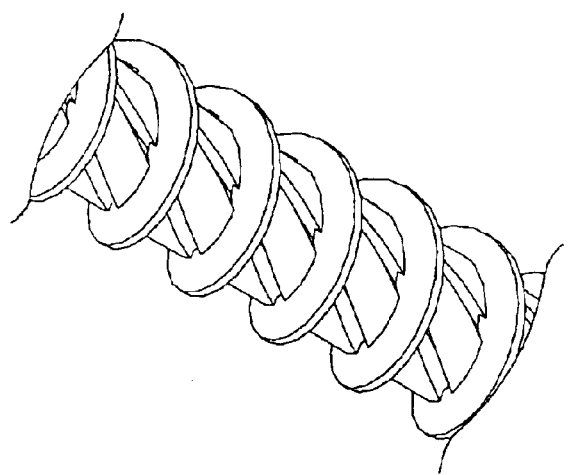
FIG. 9 is a partial perspective view of the screw for use with a steel workpiece.
Figure 8:
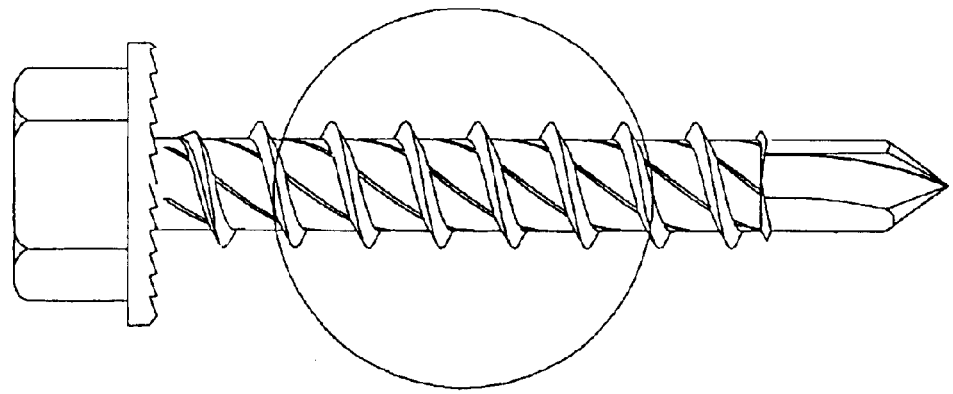
FIG. 8 is a side view of the screw for use with a steel workpiece according to the present invention.
Figures 10, 11:
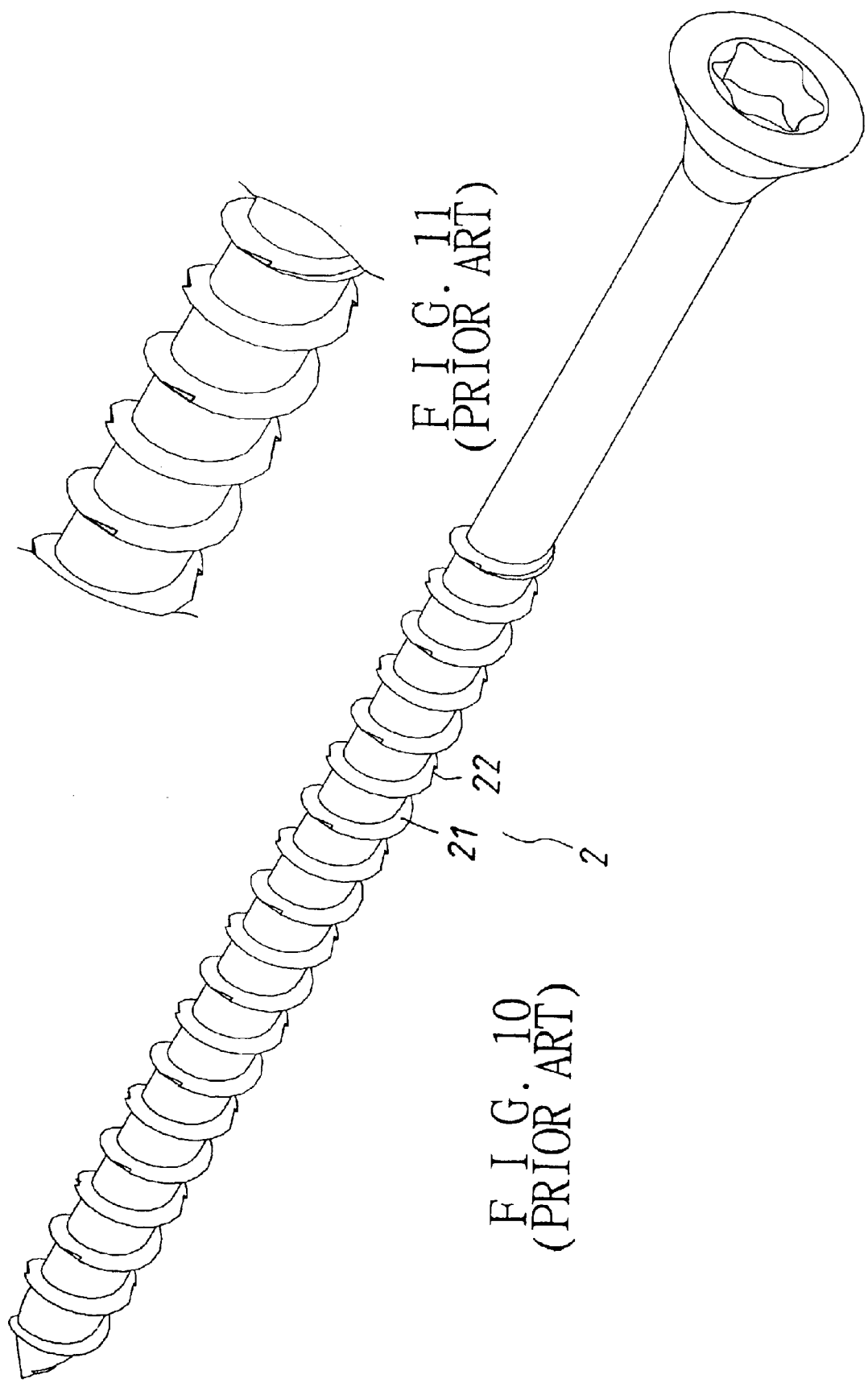
FIG. 10 is a perspective view of the prior screw in the Background.
FIG. 11 is a partial perspective view of the screw in FIG. 10.

Referring to FIGS. 8 and 9, the cutting trenches of the present invention can also be provided to a screw that is used on steel workpiece.

From the above description, it can be easily understood that the screw of the present invention has advantages as followings:

1. The cutting trenches 13 can cut off that part of a wokpiece on contact therewith, and receive the bits of workpiece therein to prevent the screw from screwing into the workpiece in a completely forced manner that is likely to cause cracks of the workpiece.
2. The screw can be relatively easily screwed into a workpiece because the cutting trenches receive the cut-off bits of the workpiece to reduce the resistance of the same against the screw.
3. The fact that the cut-off bits of a wokpiece are received in the cutting trenches 13 can help increase the tightness of the connection of the screw to the workpiece.

4. The notch can cut a hole on the workpiece to help the tapering front end portion to rapidly screw into the same plus to prevent the workpiece from cracking.

5. The cutting teeth on the front end portion can help the screw to be screwed into a workpiece, and receive some of the bits of the workpiece in the spaces therebetween.

What is claimed is:

1. A screw, comprising:

a rod-shaped part including a cylindrical intermediate portion, and a conical front end portion extending longitudinally from the cylindrical intermediate portion, the conical front end portion tapering towards a pointed front end tip, the rod-shaped part defining a circumferential surface;

a continuous spiral-shaped thread winding around both the cylindrical intermediate portion and the tapering front end portion of the rod-shaped part, the thread being uninterrupted about the cylindrical intermediate portion, said continuous spiral-shaped thread having a plurality of teeth integrally formed thereon, said plurality of teeth projecting radially with respect to a longitudinal axis of said rod-shaped part; and a plurality of cutting trenches recessed into the circumferential surface of the rod-shaped part so as to form edges with the circumferential surface for cutting bits off a workpiece when the screw is being screwed therein, longitudinally offset ones of the cutting trenches being separated by a portion of the thread the circumferential surface extending between adjacent ones of the cutting trenches.

2. The screw of claim 1, wherein the cutting trenches are made to be straight.

3. The screw of claim 1, wherein the cutting trenches are made to be spiral.

4. The screw of claim 1, wherein the tapering front end portion is provided with a notch, which is formed along the tapering front end portion as well as being cut onto a portion of the thread corresponding to the tapering front end portion.

5. The screw of claim 1, wherein the workpiece is made of steel.

6. A screw, comprising:

a rod-shaped part including a cylindrical intermediate portion, and a conical front end portion extending longitudinally from the cylindrical intermediate portion, the conical front end portion tapering towards a pointed front end tip, the rod-shaped part defining a circumferential surface;

a continuous spiral-shaped thread winding around both the cylindrical intermediate portion and the tapering front end portion of the rod-shaped part, the thread being uninterrupted about the cylindrical intermediate portion, and a plurality of cutting trenches recessed into the circumferential surface of the rod-shaped part so as to form edges with the circumferential surface for cutting bits off a workpiece when the screw is being screwed therein, longitudinally offset ones of the cutting trenches being separated by a portion of the thread, said cutting trenches being formed in a spiral-shape, the circumferential surface extending between adjacent ones of the cutting trenches.

* * * * *